US010513355B2

(12) United States Patent
Dietrich, Jr.

(10) Patent No.: US 10,513,355 B2
(45) Date of Patent: Dec. 24, 2019

(54) MINIMAL AMOUNT DOSING DEVICE, IN PARTICULAR FOR PHARMACEUTICAL APPLICATIONS, AND METHOD FOR MINIMAL AMOUNT POWDER DOSING METHOD

(71) Applicant: Fydec Holding AG, Ecublens (CH)

(72) Inventor: Frédéric Dietrich, Jr., Morrens (CH)

(73) Assignee: Fydec Holding AG, Ecublens (CH)

( * ) Notice: Subject to any disclaimer, the term of this patent is extended or adjusted under 35 U.S.C. 154(b) by 0 days.

(21) Appl. No.: 16/064,138

(22) PCT Filed: Dec. 8, 2016

(86) PCT No.: PCT/EP2016/080335
§ 371 (c)(1),
(2) Date: Jun. 20, 2018

(87) PCT Pub. No.: WO2017/108439
PCT Pub. Date: Jun. 29, 2017

(65) Prior Publication Data
US 2019/0009934 A1    Jan. 10, 2019

(30) Foreign Application Priority Data

Dec. 21, 2015 (EP) .................................... 15201571

(51) Int. Cl.
*B65B 1/16* (2006.01)
*B65B 1/36* (2006.01)
(Continued)

(52) U.S. Cl.
CPC ................. *B65B 1/16* (2013.01); *B65B 1/36* (2013.01); *G01F 11/003* (2013.01); *G01F 11/28* (2013.01);
(Continued)

(58) Field of Classification Search
CPC . B65B 1/16; B65B 1/36; G01F 11/003; G01F 11/28; G01F 11/10; G01F 15/125; A61J 3/02; A61J 3/074
(Continued)

(56) References Cited

U.S. PATENT DOCUMENTS 2,544,054 A * 3/1951 Smith ....................... B65B 1/16
406/171
3,265,098 A * 8/1966 O'Neal ................. B65G 53/22
141/10
(Continued)

FOREIGN PATENT DOCUMENTS

DE           3040659 A1    5/1981
DE    102007044753 A1    4/2009
(Continued)

OTHER PUBLICATIONS

International search report for patent application No. PCT/EP2016/080335 dated Mar. 7, 2017.

*Primary Examiner* — Benjamin R Shaw
(74) *Attorney, Agent, or Firm* — Bachman & LaPointe, PC

(57) ABSTRACT

A minimal-amount powder metering device (1) for pharmaceutical or chemical applications, for metering powder volumes of less than 1 cm$^3$, comprising a metering chamber (3) which is delimited by a surrounding wall (9) and which can be connected to a vacuum source (28) for suctioning powder in order to fill the metering chamber (3) with powder to be metered, filter means for retaining powder in the metering chamber (3) during a suctioning process being associated with the metering chamber (3), including the filter means are formed by the surrounding wall (9) and including at least one suction opening (12, 13) which serves to retain the powder in the metering chamber (3) and through which a vacuum can be applied to the metering chamber (3) is formed in the surrounding wall (9).

16 Claims, 3 Drawing Sheets

(51) Int. Cl.
 *G01F 11/00* (2006.01)
 *G06F 11/28* (2006.01)
 *A61J 3/02* (2006.01)
 *A61J 3/07* (2006.01)
 *G01F 11/10* (2006.01)
 *G01F 15/12* (2006.01)
 *G01F 11/28* (2006.01)

(52) U.S. Cl.
 CPC .............. *A61J 3/02* (2013.01); *A61J 3/074* (2013.01); *G01F 11/10* (2013.01); *G01F 15/125* (2013.01)

(58) Field of Classification Search
 USPC .......................................................... 222/361
 See application file for complete search history.

(56) References Cited

U.S. PATENT DOCUMENTS

| | | | | |
|---|---|---|---|---|
| 3,324,902 A * | 6/1967 | Lense | ............... | A61J 3/074 141/1 |
| 4,709,837 A | 12/1987 | Erdman | | |
| 4,770,214 A * | 9/1988 | Ginter | ............... | B65B 1/20 141/171 |
| 5,357,793 A * | 10/1994 | Jouwsma | ............... | G01F 1/40 138/40 |
| 5,375,631 A * | 12/1994 | Mochizuki | ............ | B65B 31/042 141/10 |
| 5,775,389 A * | 7/1998 | Griffin | ............... | G01F 11/282 141/100 |
| 5,797,435 A * | 8/1998 | Wada | ............... | B65B 1/366 141/144 |
| 6,340,036 B1 * | 1/2002 | Toyoizumi | ............ | B65B 1/12 141/275 |
| 6,408,894 B1 * | 6/2002 | Davankov | ............ | B01D 15/00 141/12 |
| 8,201,591 B2 * | 6/2012 | Monti | ............... | B65B 1/36 141/12 |
| 2004/0168739 A1 * | 9/2004 | Bonney | ............... | C07C 45/00 141/7 |
| 2016/0298663 A1 * | 10/2016 | Stahl | ............... | B01D 53/0446 |

FOREIGN PATENT DOCUMENTS

| | | |
|---|---|---|
| DE | 202013004663 U1 | 6/2013 |
| EP | 0265451 B1 | 5/1990 |
| EP | 2652451 B1 | 5/1990 |
| EP | 2281683 A1 | 2/2011 |
| EP | 2674364 A1 | 12/2013 |
| EP | 3184971 A1 | 6/2017 |

\* cited by examiner

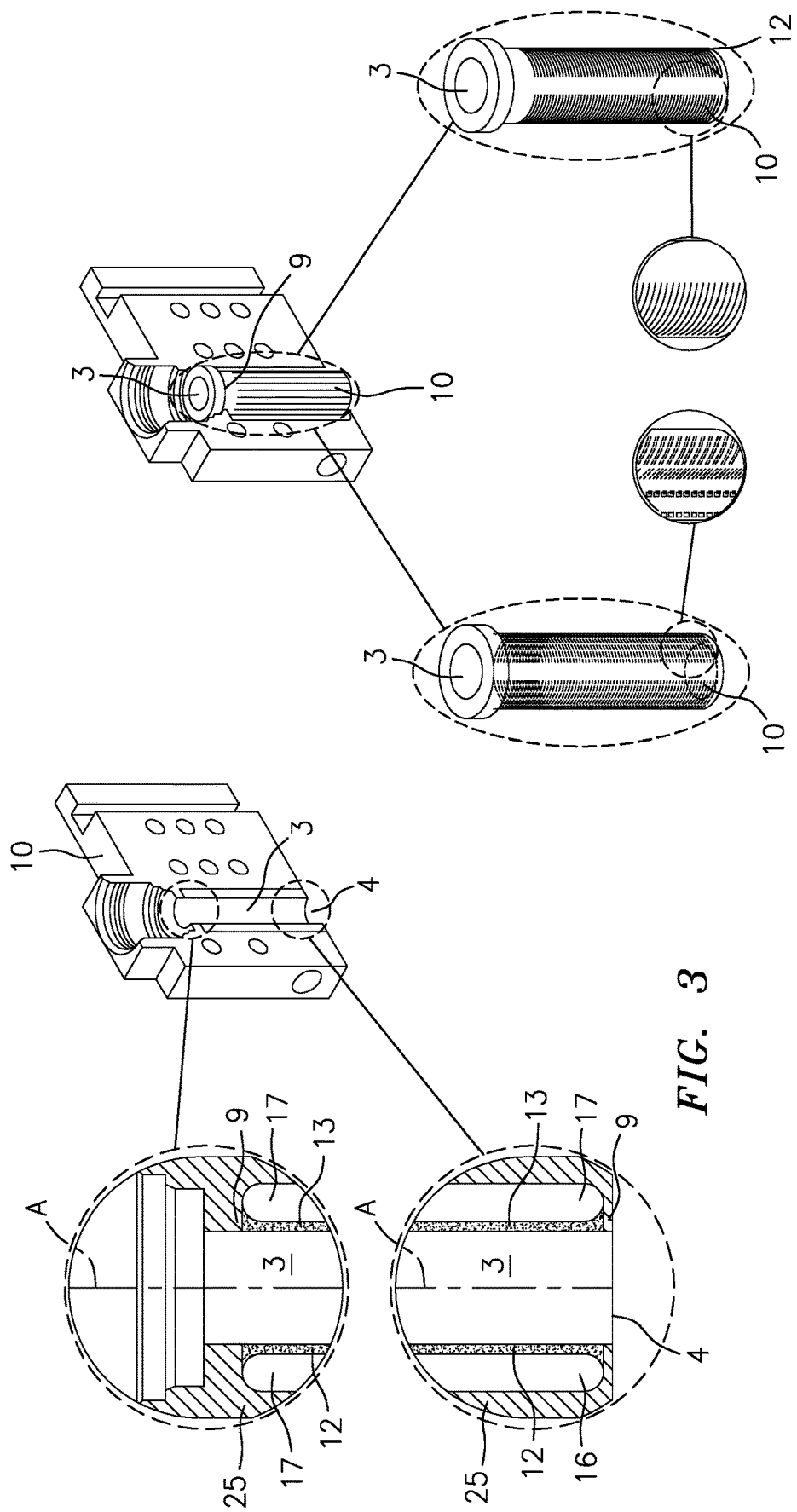

MINIMAL AMOUNT DOSING DEVICE, IN PARTICULAR FOR PHARMACEUTICAL APPLICATIONS, AND METHOD FOR MINIMAL AMOUNT POWDER DOSING METHOD

BACKGROUND OF THE INVENTION

The invention relates to a minimal-amount powder metering device, in particular for pharmaceutical or chemical applications for metering powder volumes of less than 1 cm$^3$, preferably less than 150 mm$^3$, comprising a metering chamber which is delimited by a surrounding wall and which can be connected to a vacuum source for suctioning powder in order to fill the metering chamber with powder to be metered, filtering means for retaining powder in the metering chamber (and thus preventing powder from being sucked into the vacuum source) during a suctioning process, i.e. during filling, being associated with the metering chamber. The surrounding wall delimits the metering chamber preferably in the outward radial direction, in particular in relation to a preferably vertical metering-chamber axis which preferably extends perpendicular to a metering-chamber filling and/or emptying opening and/or coincides with a displacement axis (to be explained later) of a preferably provided ejection plunger.

Furthermore, the invention relates to a method for metering minimal amounts, in particular having a mean particle diameter of $x_{50.3} < 50$ μm. The powders preferably are pharmaceutical or chemical substances. In a particularly preferred manner, the method is carried out using a minimal-amount metering device according to the invention. The method also requires a metering chamber for powder to be metered, the metering chamber being filled with powder to be metered by applying a vacuum to the metering chamber, the vacuum being applied through filter means so as to retain most of the powder suctioned during a metering process in the metering chamber by means of said filtering means.

From EP 2 652 451 B1, a powder metering device is known in which a metering chamber delimited by a surrounding wall is filled with powder to be metered by applying a vacuum to the metering chamber through a filter membrane. Said known powder metering device is very advanced compared to other powder metering devices known before because the metering chamber is filled and emptied through one and the same opening, whereas in older metering devices, the powder to be metered was sucked in through a lateral filling opening and discharged downward by applying pressure.

The known technology reaches its limits with minimal amounts or minimal volumes of powder because as the metering-chamber volume decreases, the available filter surface theoretically decreases as well until typically screen-shaped filter membranes that small can barely or no longer be fabricated. Moreover, the porosity, i.e. the maximum possible flow through such a small filter membrane decreases to very small values at which the transfer of gas, i.e. a suctioning of gas through the filter membrane becomes highly problematic and thus a secure, in particular complete filling of the metering chamber can no longer be ensured. Moreover, very small filter membranes such as the ones that would be needed for the minimal amounts of interest here would be extremely fragile and difficult to seal.

Solutions are sought to overcome the aforementioned problems, in particular in view of growing efforts to achieve individualized metering of active pharmaceutical ingredients (API) of drugs. The current practice of large-scale metering consists in the active ingredient first being mixed with an excipient and then metering them together in larger metering volumes. However, the problem here is the relatively non-homogenous mixture and the lack of an option of individualized, i.e. patient-specific metering. Hence, a metering device and a metering method are to be provided that meet these requirements and allow minimal amounts (of active ingredients) to be metered accordingly and preferably be added to an excipient.

SUMMARY OF THE INVENTION

Based on the aforementioned state of the art, the object of the invention is to provide a minimal-amount powder metering device, in particular for pharmaceutical or chemical applications, by means of which powder volumes of less than 1 cm$^3$, even more preferably of less than 500 mm$^3$, particularly preferably of less than 200 mm$^3$ or still less can be metered automatically and complete filling of the metering chamber is ensured and filter issues in terms of flow rate and robustness are securely avoided. Furthermore, the object is to provide a correspondingly improved method for metering minimal amounts of powder.

Said object is attained with regard to the minimal-amount powder metering device having the features disclosed herein, i.e. in the case of a generic minimal-amount powder metering device, by the filter means comprising at least one suction opening which is formed in the surrounding wall and which serves to retain the powder in the metering chamber and through which a vacuum is applied to the metering chamber.

With regard to the method, the object is attained with the features disclosed herein, i.e. in the case of a generic method, by the filter means comprising at least one suction opening which is formed in the surrounding wall and through which a vacuum is applied to the metering chamber in particular in such a manner that by means of the at least one suction opening, preferably each suction opening, at least 90 wt %, preferably at least 95 wt %, even more preferably at least 99 wt % of the powder particles suctioned during a filling process are retained in the metering chamber.

Advantageous embodiments of the invention are provided in the dependent claims. Any and all combinations of at least two of the features disclosed in the description, in the claims, and/or in the figures shall fall within the scope of the invention. To avoid repetition, features disclosed in connection with the device shall be deemed disclosed and claimable in connection with the method as well. Likewise, features disclosed in connection with the method shall be deemed disclosed and claimable in connection with the device as well.

The invention is based on the idea of providing at least one suction opening, i.e. a passage channel or cutout, in the surrounding wall delimiting the metering chamber through which a vacuum can be or is applied to the metering chamber and by means of which preferably most of the suctioned powder can be or is retained in the metering chamber during a filling or suctioning process, in particular while omitting a filter element, in particular a filter fabric, that is separate from the surrounding wall of the metering chamber and/or axially delimits the metering chamber. In other words, the filter means are moved into the surrounding wall or formed by the surrounding wall by providing at least one suction opening in the surrounding wall through which gas, in particular air, can be sucked out of the metering chamber so as to fill the metering chamber through a filling opening, the at least one suction opening being configured in such a manner, i.e. having such an inner width, that it fulfils the desired filtering function.

As will be explained later, there are different options of realizing the at least one suction opening in terms of the specific geometric design and the number of suction openings to be provided. With regard to simple and optimized fabrication while simultaneously ensuring a sufficiently high gas flow, it is particularly preferred for the at least one suction opening to be realized as a suction slit whose length is significantly greater than its width (each preferably measured perpendicular to the depth or flow direction), wherein it is particularly preferred if the width is selected such that it is the limiting filtration factor. In a particularly preferred case, a gap width measured perpendicular to the length of the slit is less than 50 μm, particularly preferably less than 30 μm, the specific slit width being preferably selected as a function of the particle size distribution and the type of powder to be metered. In the case of sticky powders, for example, it is possible to set a width or generally an inner width measured in one dimension of a cross-sectional area of the at least one suction opening at an upper limit, whereas correspondingly small inner widths or slit widths are preferably selected for metering non-sticky or only slightly sticky particles of minimal size having a very small particle size distribution. As will be explained in more detail later, the invention is not limited to providing slit-shaped suction openings; the suction openings can basically have any given geometrical shape as long as complete filling of the metering chamber with powder to be metered and sufficient retention of powder in the metering chamber during filling are ensured.

In a particularly preferred manner, the suction opening is tailored to the powder to be filtered, in particular to a active pharmaceutical ingredient or a chemical substance, in such a manner that at least 90 wt %, preferably et least 95 wt %, even more preferably at least 99 wt % of the powder particles suctioned during a filling process are retained in the metering chamber by the at least one suction opening, in particular by all suction openings, of the surrounding wall.

It is particularly preferred if an inner width, measured in one dimension, of the free cross-sectional area of the suction opening, in particular a (smallest) slit width and/or a (smallest) edge length or a minimum diameter is less than an $x_{30.3}$ ($d_{30.3}$) particle diameter of the particle size distribution, particularly preferably less than an $x_{20.3}$ ($d_{20.3}$) diameter, or corresponds to or is smaller than an $x_{10.3}$ ($d_{10.3}$) particle diameter of the powder to be metered. The aforementioned inner width does not have to be the smallest particle diameter of the powder particles to be metered in order for the desired filtration or retention results to be achieved because it has been observed that these smallest particles are trapped between larger particles of the particle mixture (powder mixture) and do not break free during the filling process (dense phase). Powder or particle mixtures of this kind, which are of interest here, flow very slowly, similarly to highly viscous non-Newtonian fluids. Thus, the fact that the inner width of the cross-sectional area of the at least one suction opening is or can be greater than a smallest particle diameter or than a particle diameter of the smallest particles of the powder to be metered shall be deemed disclosed and claimable within the scope of a modification of the invention.

In principle, it is possible under certain conditions to select the inner width, in particular a slit width of the cross-sectional area of the at least one suction opening, such that it is no more than ten times the mean diameter $x_{50.3}$ ($d_{50.3}$) of the particles to be metered or of the powder to be metered. Selecting such a relatively large inner width or suction-opening width is possible in particular in the case of very sticks powders, preferably pharmaceutical substances. Preferably, however, the inner width, i.e. a smallest size of the cross-sectional area of the at least one suction opening, is smaller and accounts for preferably no more than five times the $x_{50.3}$ diameter, even more preferably nor more than twice the $x_{50.3}$ diameter or matches the $x_{50.3}$ diameter or, particularly preferably, is smaller than such a $x_{50.3}$ particle diameter of the particles to be metered.

Overall, the minimal-amount powder metering device and the method for metering minimal amounts of powder according to the invention come with significant advantages compared to conventional systems which, preferably contrary to the device according to the invention and to the method according to the invention, work with filter elements separate from the surrounding wall and typically axially delimiting the metering chamber. For instance, a very large number of suction openings and/or suction openings that guarantee sufficient gas flow and a good filtering effect at the same time owing to their geometry, which is elongated, for example, and slit-shaped in particular, can be realized in the surrounding wall in a relatively simple manner, in particular because the circumferential surface, in particular the shell surface, of a metering chamber offers a lot of space for providing at least one correspondingly designed suction opening as compared to a very limited axial surface area of metering chambers preferably designed in the shape of a circular cylinder. Moreover, a comparatively large amount of material is available, making it possible to guarantee a robust design despite the favorable filter properties.

In the course of the method according to the invention and/or for configuring the at least one suction opening in the minimal-amount powder metering device according to the invention, pharmaceutical powders, in particular active ingredients or, alternatively, chemical compounds are preferably used that have a particle size distribution with a mean volume-specific particle diameter $x_{50.3}$ of less than 50 μm, preferably of less than 30 μm, particularly preferably of less than 10 μm.

It is particularly preferred if the surrounding wall of the metering chamber delimits the metering chamber outward in the radial direction relative to a metering-chamber axis, which is preferably disposed vertical and/or is perpendicular to a cross-sectional area of a filling and/or emptying opening of the metering chamber and/or is defined by or coincides with a displacement axis of an optional, but preferably provided ejection plunger, which can preferably be displaced relative to the surrounding wall in order to eject powder after a filling process. It is particularly preferred if the surrounding wall of the metering chamber has a cylindrical, in particular a circular-cylindrical, metering-chamber volume, i.e. if it has an cylindrical inner contour and is disposed coaxially around the aforementioned metering-chamber axis, which preferably forms a longitudinal center axis. Furthermore, it is particularly advantageous if the at least one suction opening extends in the radial direction in relation to the metering-chamber axis of the surrounding wall (which, however, is not absolutely necessary) and/or ends in a suction space disposed next to the metering chamber and connectable to the at least one vacuum source via corresponding valve means.

As explained in the beginning, the powder metering device according to the invention is a metering device for minimal amounts (minimal volumes) of less than 1 cm³. It is particularly preferred, however, if the volume that can or is to be metered and thus the metering-chamber volume is even (significantly) smaller. Corresponding preferred metering-chamber volumes are defined in dependent claim 2. The metering-chamber volumes can be fixed metering-chamber volumes, i.e. metering-chamber volumes that cannot be changed manually or automatically, or, alternatively, the metering-chamber volume can be a changeable metering-chamber volume, which can be adjusted using a volume-limiting drive, in particular by means of a plunger, preferably the aforementioned ejection or discharge plunger, so as to be able to meter different volumes depending on the application using the same minimal-amount metering device. The metering-chamber volume addressed here preferably is the metering-chamber volume during a filling process; the optional compressed metering-chamber volume, which is the result of a displacement of an ejection plunger into the metering chamber with the aim of compressing the powder, for example, is smaller than the metering-chamber volume mentioned above.

Additionally or alternatively, the metering chamber is configured for metering a powder quantity of between 0.1 mg and 5 mg, preferably between 0.1 mg and 100 mg, even more preferably between 0.1 mg and 60 mg, particularly preferably between 0.1 mg and 5 mg, even more preferably of 0.1 mg and 30 mg, particularly preferably between 0.1 mg and 20 mg, even more preferably between 0.1 mg and 1 mg, particularly preferably between 0.1 mg and 0.5 mg, particularly preferably between 0.1 mg and 0.4 mg, or less, and such a powder quantity is metered by way of the method.

As explained in the beginning, it is substantial not only that a vacuum can be applied to the metering chamber through the suction opening but also that the suction opening is designed such that owing to its geometric design, it fulfils the filter function in particular in spite of filter elements separate from the at least one suction opening and directly limiting the metering chamber being omitted. To this end, it is particularly advantageous if the at least one suction opening has a free cross-sectional area which is preferably measured perpendicular to an axial direction or a direction of extension of the suction opening or suction channel, whose inner width is 50 µm or less in at least one dimension, preferably in no more than one dimension. It is particularly preferred if said inner width is 30 µm or less, even more preferably 20 µm or less. The lower limit is substantially defined by the method of production and/or depends on the selected metering-chamber volume. Preferably, a lower limit of the inner width is 1 µm or is preferably even smaller, particularly preferably 0.1 µm or less. The inner width is a dimension of the free cross-sectional area that is responsible for retaining the particles in the metering chamber. Depending on the geometry of the suction opening, the inner width can be formed by a width of the suction opening, for example, which is the case in particular in the case of suction opening slits that are slit-shaped, straight or curved. In this case, the inner width preferably is the suction opening extension measured perpendicular to the length and depth of the suction opening. In the case of more point-shaped or circular or polygonal suction openings, the inner width can also be defined by a minimum suction opening diameter, which is preferably measured perpendicular to the depth, or by a minimum edge length, i.e. the smallest, preferably straight edge length of an edge of the suction opening. In any event, the inner width is the size or dimension of the suction opening cross-section that defines the filter station.

As previously explained, a slit-shaped, e.g. straight or alternatively curved or helical contour of the cross-sectional area of the suction opening is particularly preferred, the aforementioned inner width preferably being measured between two opposite, preferably parallel longitudinal edges of the slit, i.e. perpendicular to the length of the suction opening and perpendicular to the depth. It is particularly preferred if the at least one suction slit is dimensioned such that its length is at least 100 times, preferably at least 1000 times greater than the width of the slit (inner width).

In the case of a slit-shaped suction opening, in particular, it has proved advantageous if the suction opening extends across at least 50%, preferably across at least 80%, of a metering-chamber length measured parallel to a predefined metering-chamber axis, preferably, however not necessarily, in the axial direction.

In principle, the at least one suction opening can be realized using different technologies. For instance, it is conceivable for the suction opening to be formed during 3D printing of the metering-chamber surrounding wall, which consists of metal and/or plastic granules, for example, or alternatively by etching, in particular in the course of a photolithographic production procedure. Mechanical processing is conceivable as well, in particular by machining methods or a production by erosion, in particular spark erosion. It is also possible in principle to produce the at least one suction opening by fluid-jet drilling or laser-beam drilling.

It has proved particularly advantageous for the metering-chamber surrounding wall to be formed in multiple parts or in multiple, in particular two, even more preferably no more than two parts disposed next to each other (next to each other or preferably adjacent to each other in the circumferential direction about the metering-chamber axis and/or axially along the metering-chamber axis), which preferably are in contact with each other in sections only, and for the at least one suction opening to be realized between these metering-chamber surrounding-wall parts (in particular in the at least one non-contact portion), which is particularly advantageous for slit-shaped (elongated) suction openings, but not limited thereto. This is because when multiple metering-chamber surrounding-wall parts are provided, at least one of the metering-chamber surrounding-wall parts located on a side opposite another metering-chamber surrounding part, in particular a circumferential side or axial side, when in the mounted state can be processed mechanically by material removal, for example, resulting in the desired, in particular slit-shaped suction opening between the at least two metering-chamber surrounding-wall parts in the mounted state because the adjacent metering-chamber surrounding-wall parts are not in full-surface contact with each other anymore because of the material removal; instead, at least one suction opening is delimited between them, in particular in sections. In general, it is sufficient for one of the metering-chamber surrounding-wall parts to be processed in this way, while it is also possible alternatively to process both metering-chamber surrounding-wall parts on the surfaces facing each other in the mounted state (i.e. faces that would be in plane contact with each other if unprocessed) in order to form the at least one suction opening. It is particularly preferred if at least one elongated suction opening slit extending axially parallel to the metering-chamber axis is produced by the described method or the described configuration, while alternatively at least one slit extending in the circumferential direction can alternatively also be realized axially between two metering-chamber surrounding-wall parts, as can a suction-opening slit extending at an angle, in a curve, or in a helix.

As indicated in the beginning, it is particularly preferred if the filling and emptying openings of the metering chamber are formed by a joint opening, i.e. the same opening, which is particularly preferably located at a lower end of the metering chamber, i.e. oriented vertically downward.

All in all, the formation of the at least one suction opening between two surrounding-wall parts has the advantage that the suction opening can be easily produced using conventional processing techniques, in particular machining techniques, and that the surrounding wall of the metering chamber can also be removed in order to thoroughly, e.g. manually, clean the suction opening(s) after a certain operating time.

A suction opening that is slit-shaped and/or disposed between two surrounding-wall parts has the added advantage that it is easy to clean and sterilize using steam and/or hydrogen peroxide, for example. Moreover, slit-shaped suction openings are less likely to retain liquid sterilizing or cleaning fluid by capillary action.

As also indicated in the beginning, it is particularly preferred if an ejection plunger is provided which serves to eject the powder, i.e. to empty the metering chamber, and which can be displaced relative to the surrounding wall of the metering chamber by means of a drive, namely by active displacement of the ejection plunger and/or of the surrounding wall. Preferably, ejection or emptying by compressed air, i.e. blowing-out, as typically employed so far is dispensed with because this might lead to excessive dispersal of the small amounts or volumes that are of interest here. If required, the ejection plunger can be used to compact the powder to be metered after a filling process and prior to an emptying process.

To allow for automated, in particular regular cleaning of the suction openings to remove any powder that might stick to or be stuck in them, an embodiment of the invention advantageously envisages two suction openings that are preferably, but not necessarily disposed diametrically opposite each other and which can be supplied with a vacuum one after the other, in particular independently of each other, particularly preferably alternately, so that by connecting one of the suction openings to a pressure source, the at least one other suction opening (which is preferably connected to a higher pressure level, in particular atmospheric pressure) can be flushed into the metering chamber by sucking out powder residue. To this end, valve means by means of which the suction openings can be connected to at least one vacuum source and/or to a higher pressure level at different points in time are associated with the at least two suction openings. Depending on the configuration of the cleaning step, the cleaning step can take place during the simultaneous filling of the vacuum chamber with powder, i.e. in such a manner that by connecting one of the suction openings to a vacuum source, powder is simultaneously sucked from the filling opening or the filling opening is at least open and, at the same time, powder residue is sucked from another one of the suction openings, the suction opening to be flushed preferably being connected to a higher pressure level in that case. Alternatively, it is possible to perform the cleaning step prior to and/or after filling, i.e. while the filling opening is closed and/or not connected to a powder storage. It is particularly preferred if one of the suction openings is flushed after a filling process, i.e. after having been connected to the vacuum source, in the manner described above, i.e. by means of the method described above, before it is connected to the vacuum source again for another filling process.

In a particularly preferred manner, the metering device according to the invention is operated as follows:

First, powder is suctioned through the preferably joint filling and emptying opening, the vacuum being supplied through a suction opening located in the surrounding wall. In a particularly preferred manner, the vacuum is supplied only through some, in particular half, of the provided suction openings.

This is followed by optional compression by means of an optional ejection plunger and then by the ejection of the powder portion, in particular by means of the ejection plunger. Prior to a next metering step, the suction opening(s) still supplied with the vacuum in a previous metering process, in particular in the last metering process, are flushed by connecting another one of the suction openings to a vacuum. Said flushing process can be performed prior to the next filling process and/or at least partially overlap with the next filling process. Preferably, the at least one suction opening to be flushed is connected to a higher pressure level (higher than the vacuum level), in particular to the atmosphere, during said flushing process. Preferably, the suction openings are flushed alternately.

Other advantages, features and details of the invention are apparent from the following description of preferred embodiments and from the drawings.

BRIEF DESCRIPTION OF THE DRAWINGS

FIG. 3: shows the illustration of a preferred embodiment of a surrounding-wall part of the metering chamber and two enlarged detail illustrations, FIG. 4: shows two alternative embodiments of metering-chamber surrounding walls.

In the Figures, similar elements and elements having similar functions are marked with similar reference signs.

DETAILED DESCRIPTION

Figure 1:
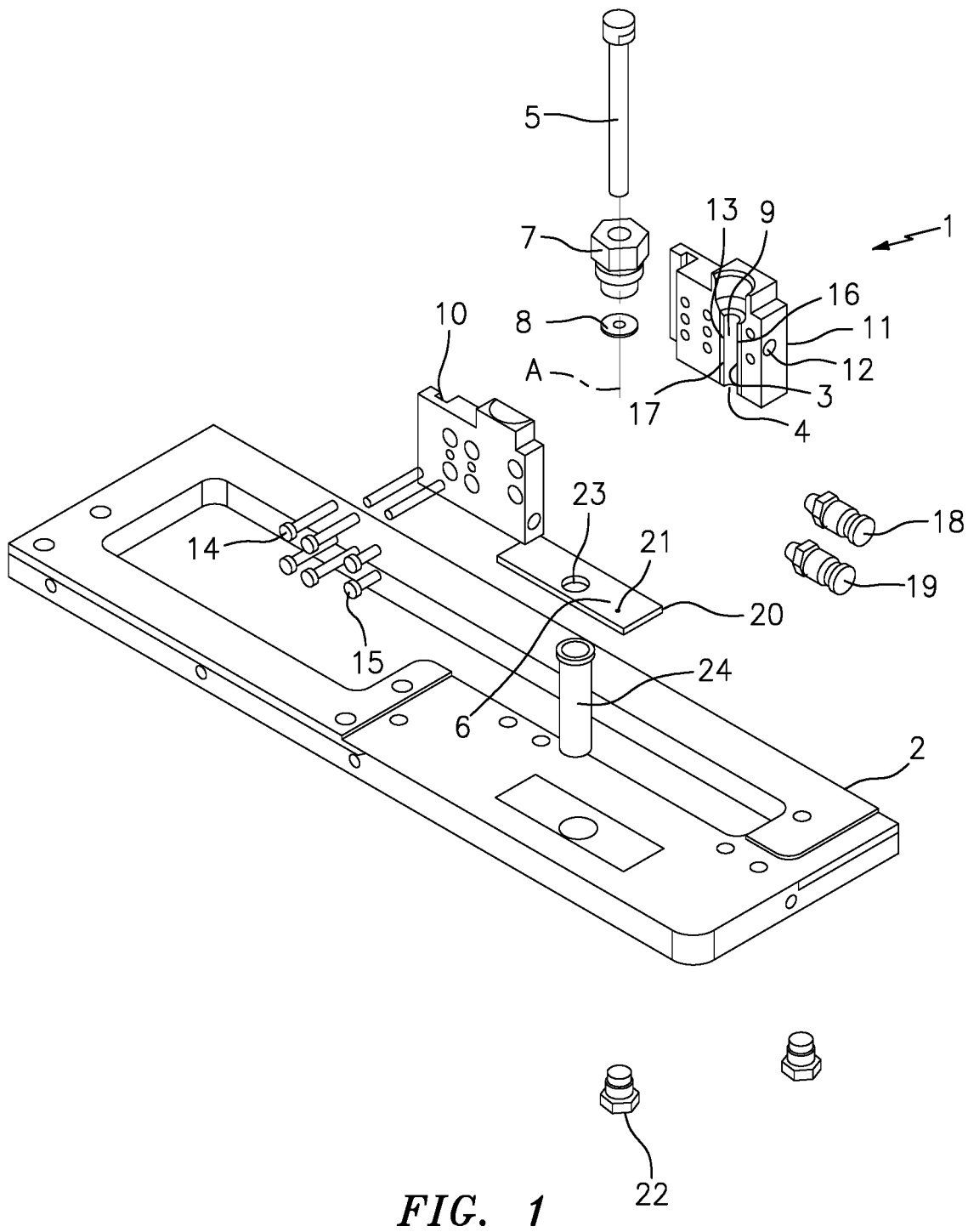
FIG. 1: shows an exploded view of some components of a minimal-amount metering device according to the invention.

In FIG. 1, some components of a minimal-amount metering device 1 (hereinafter metering device 1) configured according to the concept of the invention are shown.

The metering device 1 comprises a support plate 2, on which a metering chamber 3 is disposed. The metering chamber 3 comprises a joint lower filling and emptying opening 4. Opposite the filling and emptying opening 4 of the hollow cylindrical metering chamber 3, an ejection plunger 5 protrudes into the metering chamber 3, i.e. from above in the drawing, said ejection plunger 5 being axially displaceable, e.g. hydraulically, pneumatically or by electric motor, along a metering-chamber axis A extending perpendicular to the filling and emptying opening 4 so as to transport powder out of the metering chamber 3 and to compress the powder in a compressing step, which is optional as will be explained later. The ejection plunger 5 directly limits the metering chamber axially at the top; no axial filter element is provided.

The ejection plunger 5 is guided in a guiding element 7 which is disposed above the metering chamber; depending on the position of the ejection plunger, the metering chamber has a different (adjustable) metering-chamber volume. An elastomer seal 8 for sealing the guiding element 7 off from the metering chamber 3 is also visible.

FIG. 1 further shows that the metering chamber 3 is radially delimited at the outside in the circumferential direction in relation to the metering-chamber axis A by a surrounding wall 9 which limits a metering-chamber shell surface, which is circular-cylindrical on the inside. In the shown embodiment, said surrounding wall 9 is formed by two surrounding-wall parts 10, 11 which, in this specific embodiment, are plate-shaped and in contact with each other, delimiting two diametrically opposite slit-shaped suction openings 12, 13, and can be detachably fixed to each other using screws 14, 15.

In an area radially behind each suction opening 12, 13, a suction chamber 16, 17 each formed in one surrounding-wall part 10, 11 is located, and said suction chambers 16, 17 can be alternately connected to a vacuum source (not shown) and/or to a higher pressure level via ports 18, 19, namely for filling and/or flushing purposes, as will be explained later.

Below the metering chamber 3, a sliding plate 20 is located opposite the ejection plunger 5, on which the metering chamber 3 can be displaced between a filling position, an optional compression position, and an emptying position. A supply opening 21 for powder which aligns with a powder supply port 22 is located in the sliding plate 20. Said supply opening 21 defines a filling position, whereas a disposal opening 23 with an associated emptying guide 24 defines an emptying position. The optional compression position 6, in which the filling and emptying opening 4 is closed by being situated in an area between the supply opening 21 and the disposal opening 23, is located between these two positions.

For a better understanding of the structure of the metering chamber, reference is made to FIG. 3. There, one of the surrounding-wall parts 10 including an exemplary half of a metering chamber 3 is shown on the right in the drawing plane. The ejection plunger (not shown) protrudes into the metering chamber 3 from above, whereas the joint filling and emptying opening is located at the bottom.

The design of the suction openings is apparent from the enlarged illustrations on the left in the drawing plane. In relation to a contact level 25, on which the wall parts 10, 11 meet and are in contact with each other, the suction openings are recessed by 5 μm, for example, on each surrounding-wall part 10, 11 (alternatively on only one surrounding-wall part), which, in the case at hand, results in an inner width of the suction openings of 10 μm measured perpendicular to the drawing plane, whereas the length of each suction opening, measured from bottom to top in the drawing plane, is a multiple thereof, namely far more than a thousand times that in this case. Here, the inner width is oriented perpendicular to the length and perpendicular to the radial extension of the outlet opening.

In a respective area radially outside each suction opening 12, 13, the associated suction chamber 16, 17 is visible, which can be alternatively connected to a vacuum or to a higher pressure level, such as atmospheric pressure, through corresponding valve positions. As can be seen, the slit-shaped suction openings in this specific embodiment extend in the axial direction, i.e. parallel to the metering-chamber axis A, across most of the extension of the metering chamber in said direction.

In FIG. 4, alternative configurations of suction openings 10 in the surrounding wall of the metering chamber 3 are exemplarily shown on surrounding walls designed in one piece in this case, although multi-part designs, such as designs analogous to FIG. 3, can be realized here as well. For instance, on the right in the drawing plane of FIG. 4, a number of suction openings or slits extending in sections in the circumferential direction are shown which are divided into two groups which can be alternately connected to a vacuum.

On the right, FIG. 4 shows an embodiment with suction openings that are of a more point-shaped design compared to the slit-shaped configurations. Here, the exemplary inner width of 10 μm is the opening diameter. Other alternative embodiments can be realized.

Hereafter, a preferred mode of operation is described with reference to FIGS. 2a to 2h, wherein the non-shaded valves are open and the shaded valve illustrations are closed.

The structure of the minimal-amount metering device 1, which is identical in all illustrations, is the same in each case and corresponds to the exploded illustration of FIG. 1. An displacement bolt 27 is additionally visible, via which, by means of a corresponding drive, the metering chamber 3 can be displaced between a filling position, a compacting position (compression position), and an emptying position from the right to the left and back in the drawing plane. The displacement direction runs perpendicular to the metering-chamber axis A. For the sake of clarity, most of the reference signs have been added to FIG. 2a only.

A vacuum source 28, here in the shape of a vacuum pump, is visible. Two vacuum pumps are sketched in, while it is also sufficient in general to provide only a single vacuum pump for alternately supplying the different suction openings or outlet opening groups. Moreover, an increased pressure level 29 is also visible, i.e. a relief port, which is advantageous for flushing the suction openings, as will be explained later.

Figure 2A:
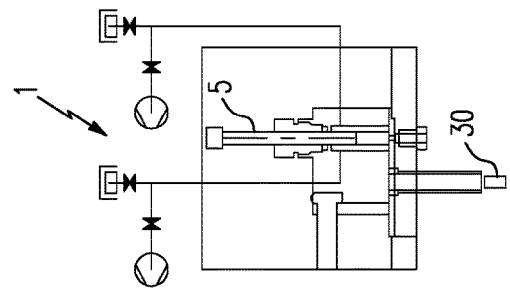
FIGS. 2a-h: show different operating states of a minimal-amount powder metering device according to the invention.

In the operating state according to FIG. 2a, the metering chamber 3 is located in the filling position, i.e. above the supply opening 21 and above the powder supply port 22. In the state according to FIG. 1, the suction opening 13 on the left of the drawing plane is connected to the vacuum source 28 (c.f. open valve), while the other suction opening 12 on the right of the drawing plane is connected to the higher pressure level 29. At this point and with the valve position shown, the suction opening 12 on the right of the drawing plane is flushed, i.e. powder sticking to the inside thereof is sucked into the metering chamber 3. Alternatively, it is possible to perform this flushing process with the filling and emptying opening 4 closed.

Figure 2B:
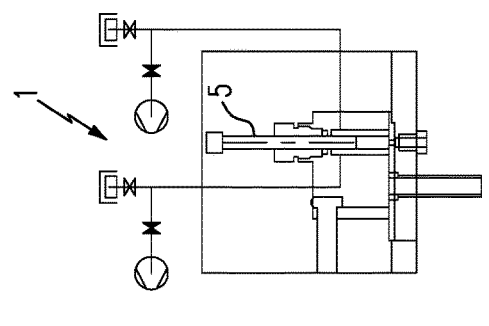
Figures 2C, 2D:
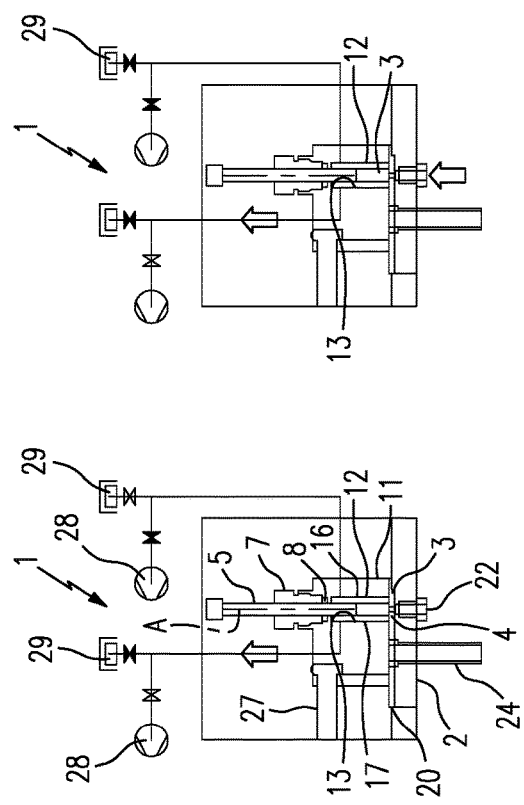

In the illustration of FIG. 2b, the slit-shaped suction opening 12 is no longer connected to the higher pressure level 29, but the suction opening 13 on the left in the drawing plane is still connected to the vacuum source, causing powder to enter the metering chamber 3 from below, as indicated by the lower arrow in the drawing plane. After filling, the metering chamber 3 is moved into the compressing position 6, as can be seen in FIG. 2c, and the ejection plunger 5 is moved downward so as to compact the powder located in the metering chamber. During compacting, the suction openings 12, 13 are deaerated and connected to the higher pressure level, respectively, so no additional flushing takes place. In FIG. 2d, compression has been completed and the metering chamber 3 has been moved further to the left in the drawing plane into the emptying position and the ejection plunger 5 has been moved downward, whereby the chamber has been emptied. In the illustration of FIG. 2d, the compressed powder volume 30 in its compressed state is located at the bottom in the drawing plane.

Figure 2E:
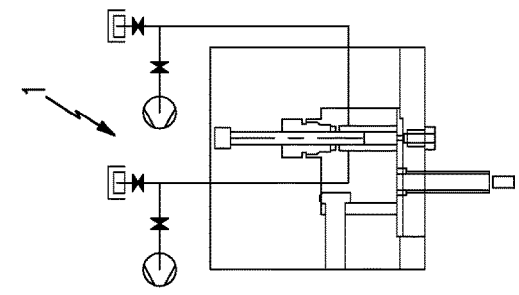
Figure 2F:
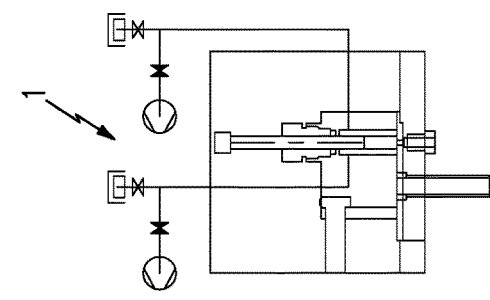
Figures 2G, 2H:
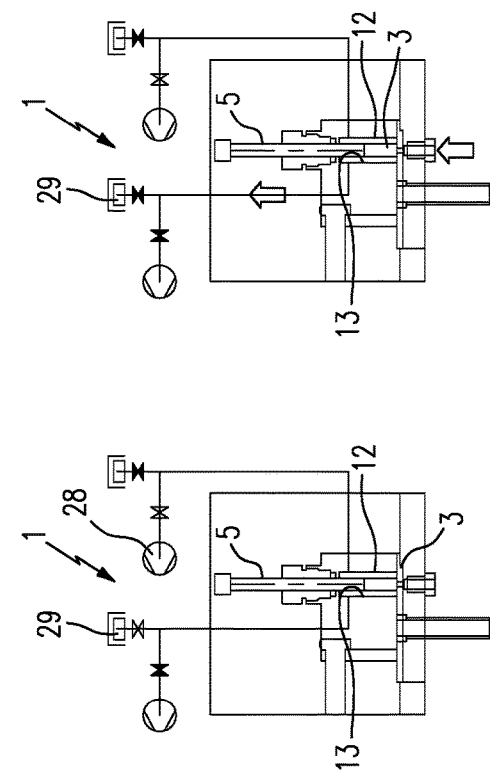

In the illustration of FIG. 2e, the metering chamber 3 has been displaced toward the filling position again. Now, the suction opening 12 located on the right in the drawing plane is connected to the vacuum source 28 (and not to the higher pressure level), while the opposite suction opening 13 is connected to the higher pressure level 29, which now causes the suction opening 13 on the left in the drawing plane to be flushed into the metering chamber 3. After flushing, the connection between the suction opening 13 and the higher pressure level 29 is closed, as shown in FIG. 2f, which now causes powder to be sucked into the metering chamber 3 via suction opening 12. In FIG. 2g, the compression step is shown analogously to FIG. 2c, and in FIG. 2h, the emptying step is shown analogously to FIG. 2d. Now, the operating states resume, starting from FIG. 2a.

REFERENCE SIGNS 1 minimal-amount powder metering device
2 support plate
3 metering chamber
4 (joint) filling and emptying opening
5 ejection plunger
6 compression or compacting position
7 guiding element
8 elastomer seal
9 (metering-chamber) surrounding wall
10 (metering-chamber) surrounding-wall part
11 (metering-chamber) surrounding-wall part
12 suction opening
13 suction opening
14 screws
15 screws
16 suction chamber
17 suction chamber
18 port
19 port
20 sliding plate
21 supply opening
22 powder supply port
23 disposal opening
24 emptying opening
25 contact level
27 displacement bolt
28 vacuum source
29 increased pressure level
30 compressed powder volume
A metering-chamber axis

The invention claimed is:

1. A minimal-amount powder metering device (1) for pharmaceutical or chemical applications, for metering powder volumes of less than 1 cm$^3$, comprising a metering chamber (3) which is delimited by a surrounding wall (9) and which can be connected to a vacuum source (28) for suctioning powder in order to fill the metering chamber (3) with powder to be metered, filter means for retaining powder in the metering chamber (3) during a suctioning process being associated with the metering chamber (3), wherein
the filter means are formed by the surrounding wall (9) and wherein at least one suction opening (12, 13) which serves to retain the powder in the metering chamber (3) and through which a vacuum can be applied to the metering chamber (3) is formed in the surrounding wall (9).

2. The minimal-amount powder metering device (1) according to claim 1, wherein a metering-chamber volume of the metering chamber (3) is less than 1 cm$^3$ and/or can be limited to such a metering-chamber-volume.

3. The minimal-amount powder metering device (1) according to claim 1, wherein the at least one suction opening (12, 13), has a free cross-sectional area whose inner width, in at least one dimension, is 50 µm or less.

4. The minimal-amount powder metering device (1) according to claim 1, wherein the at least one suction opening (12, 13) is formed in the shape of a slit, wherein a length of the slit is at least 100 times greater than a width of the slit measured perpendicular thereto.

5. The minimal-amount powder metering device (1) according to claim 4, wherein the slit-shaped suction opening (12, 13) extends across at least 50% of a length of the metering chamber.

6. The minimal-amount powder metering device (1) according to claim 1, wherein the metering-chamber surrounding wall (9) comprises multiple metering-chamber surrounding-wall parts, and wherein the at least one suction opening (12, 13) is formed between two of the metering-chamber surrounding-wall parts (10, 11).

7. The minimal-amount powder metering device (1) according to claim 6, wherein
the suction opening (12, 13) is formed by forming at least one recess in at least one of the metering-chamber surrounding-wall parts (10, 11), said recess being open in a direction oriented perpendicular to a vacuum application direction.

8. The minimal-amount powder metering device (1) according to claim 1, wherein the metering chamber (3) has a joint filling and emptying opening (4) which is oriented downward and which can be displaced between a filling position and an emptying position by means of a displacement drive.

9. The minimal-amount powder metering device (1) according to claim 1, wherein an ejection plunger (5) displaceable in the metering chamber (3) is provided for discharging the powder volume to be metered from the metering chamber (3).

10. The minimal-amount powder metering device (1) according to claim 1, wherein the filter means have at least two suction openings (12, 13) in the metering-chamber surrounding wall (9), a vacuum being applicable to said suction openings via valve means in such a manner that by applying the vacuum to at least one of the suction openings (12, 13), at least another one of the suction openings (12, 13) can be flushed into the metering chamber (3).

11. The minimal-amount powder metering device (1) according to claim 10, wherein the valve means can be controlled via control means in such a manner that the suction openings (12, 13) can be connected to a higher pressure level (29) above the vacuum level in such a manner that the at least one suction opening (12, 13) to be flushed is connected to the higher pressure level (29) while a vacuum is applied to the at least one other suction opening (12, 13).

12. A method for metering minimal amounts of powder having a mean particle diameter of $x_{50.3} < 50$ µm, using a minimal-amount powder metering device (1) according to claim 1, a metering chamber (3) being filled with powder to be metered by applying a vacuum to the metering chamber (3), the vacuum being applied through filter means so as to retain powder in the metering chamber (3) by means of said filter means, wherein
the filter means are formed by the surrounding wall (9) and wherein at least one suction opening (12, 13) is provided in the surrounding wall (9), through which the vacuum is applied to the metering chamber (3) in such a manner in particular that at least 90 wt % of the suctioned powder particles are retained in the metering chamber (3) by means of the at least one suction opening (12, 13) during a filling process of the metering chamber (3).

13. The method according to claim 12, wherein multiple suction openings (12, 13) are provided in the metering-chamber surrounding wall (9) and wherein, in an alternating manner, at least one of the suction openings (12, 13) is flushed into the metering chamber (3) by the vacuum being applied to another one of the suction openings (12, 13).

14. The method according to claim 13, wherein at least during part of a flushing interval, the at least one suction opening (12, 13) to be flushed is connected to a higher pressure level (29) than the at least one suction opening (12, 13) to which the vacuum is applied.

15. The minimal-amount powder metering device (1) according to claim 7, wherein the metering-chamber volume can be limited by a volume limitation device driven by control means or by manual displacement means.

16. The minimal-amount powder metering device (1) according to claim 1, wherein the surrounding wall (9) is a circumferential wall.

\* \* \* \* \*